Feb. 27, 1923.
A. E. MILLER.
STEERING WHEEL LOCK.
FILED JULY 9, 1920.
1,447,099.
2 SHEETS—SHEET 1.
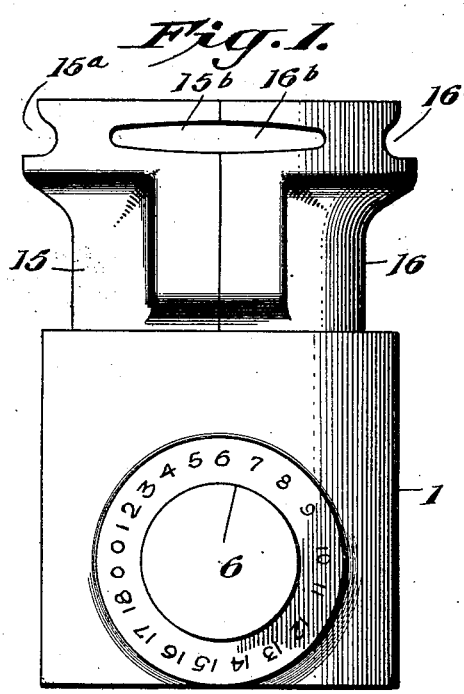
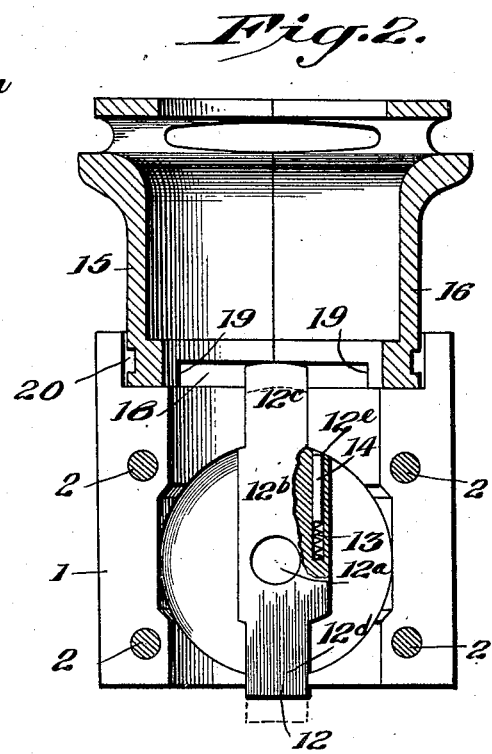
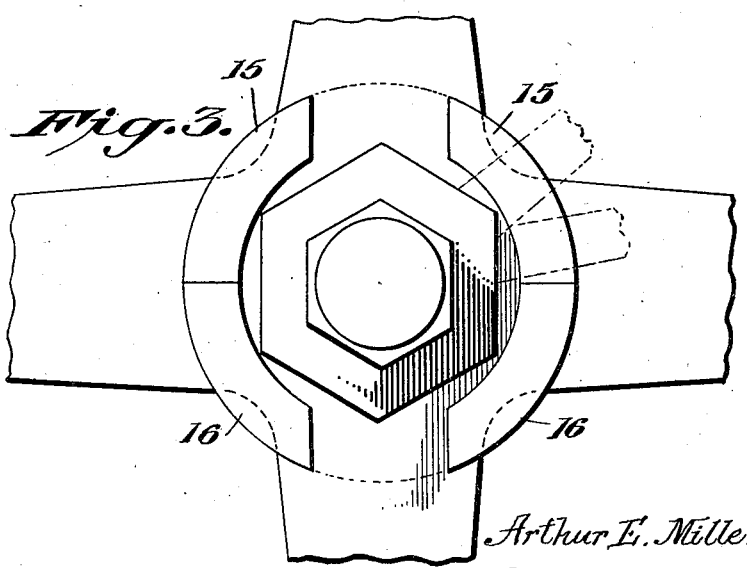
Inventor
Arthur E. Miller,
By J. Walter Fowler
Attorney
Witness:
Robert F. Beck Feb. 27, 1923.
A. E. MILLER.
STEERING WHEEL LOCK.
FILED JULY 9, 1920.
1,447,099.
2 SHEETS—SHEET 2.
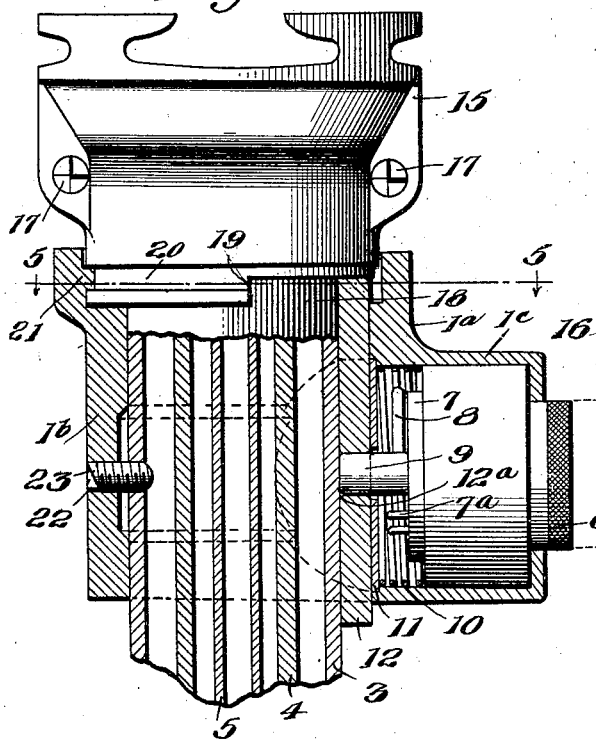
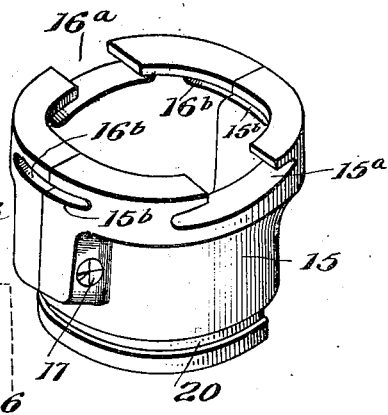
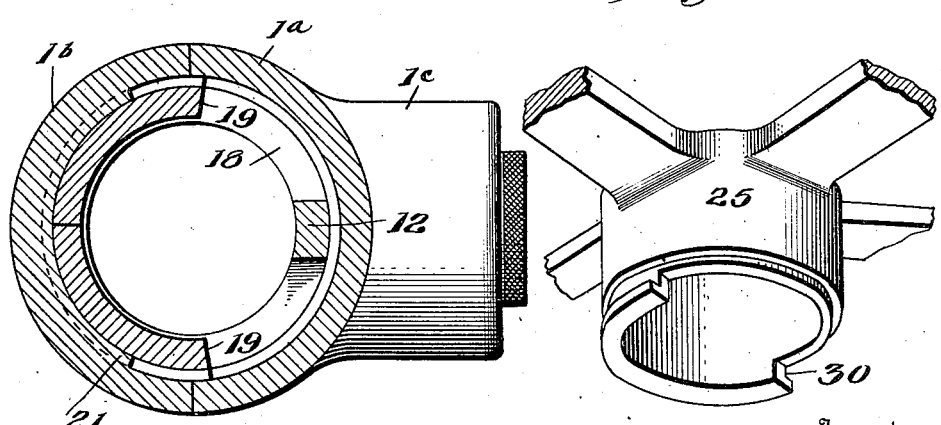
Inventor
Arthur E. Miller,
By J. Walter Fowler
Attorney
Witness:
Robert F. Beck Patented Feb. 27, 1923.

1,447,099

UNITED STATES PATENT OFFICE.

ARTHUR E. MILLER, OF SACRAMENTO, CALIFORNIA.

STEERING-WHEEL LOCK.

Application filed July 9, 1920. Serial No. 394,995.

*To all whom it may concern:*

Be it known that I, ARTHUR E. MILLER, a citizen of the United States, residing at Sacramento, in the county of Sacramento and State of California, have invented certain new and useful Improvements in Steering-Wheel Locks, of which the following is a specification, reference being had therein to the accompanying drawing.

My invention relates to certain new and useful improvements in means for locking the steering wheel of an automobile after the wheels have been turned to one side or the other of a straight line so that the machine cannot be operatively driven forward by an unauthorized person, thereby safeguarding the machine, when left in the owner's absence.

The object of my invention is to provide a lock of this character which is so constructed that it cannot be successfully tampered with, that is so constructed that it cannot be avoided by removing the steering wheel or any other part of the steering gear, that is so constructed that while it prevents a complete revolution of the steering wheel, it nevertheless allows for locking the same within a certain range so that it is possible to lock the wheel quickly without the necessity of moving the same to an exact position such as is common in the locks of this character now in use.

A further object of my invention is to provide a lock of this character wherein all of the parts constituting the locking means are so enclosed that they are not accessible to an unauthorized person for the purpose of tampering with and avoiding the lock.

In the drawing in which like numerals indicate like parts in the several views,

Fig. 1 is a front elevation of my improved locking device.

Fig. 2 is a vertical section of the same.

Fig. 3 is a top plan view of a steering wheel to which my locking device is attached;

Fig. 4 is a detail vertical view;

Fig. 5 is a sectional view on the line 5—5 Fig. 4;

Fig. 6 is a perspective view of one of the parts of my device; and

Fig. 7 is a perspective view of a modified form of my invention.

Referring to the drawing the numeral 1 indicates the outer casing of my locking device. This casing is divided into two sections 1ª 1ᵇ connected together by means of four screws 2. These screws are one-way screws, and may be of any conventional design of such one-way screws, so that when once the two sections are connected together it is not possible to disconnect them. This casing, 1, is adapted to surround the casing 3, of the steering post, the steering post itself being indicated by the numeral 4, and the spark and throttle connections by the numeral 5, in Fig. 4. The casing 1 has an offset portion 1ᶜ and enclosed within this portion is the lock proper, comprising in the present case, a combination lock having a knob, 6, surrounding which on the face of the casing are the numerals forming the combination. A pointer or other character, is placed on the knob, and this is adapted to indicate the proper numerals in the usual well known manner.

My lock contains the usual tumblers 7 having pins 7ª adapted to be engaged by a pin 8, carried by the rod 9, which is attached to the knob 6, so that the pin 8 may engage the pins 7ª and thereby rotate the tumblers to the proper position for the working of the lock. A coiled spring 10, is placed between one of the tumblers and a top disk 11. A locking pin 12 having an opening 12ª therein, is mounted adjacent the outer surface of the disk 11, and the rod 9 is adapted to enter the opening 12ª in this locking pin. This locking pin comprises a widened central portion 12ᵇ and two narrowed end portions 12ᶜ—12ᵈ. The portion 12ᵇ of the locking pin has a longitudinal opening 12ᵉ and disposed within this opening is a coiled spring 13, and a pin 14, the latter being adapted to be projected outward by the coiled spring. This pin 14 in cooperation with the spring 13, is adapted to act as an impelling means for the purpose of throwing the lock out of position when the combination has been so worked that it is possible to do so. Adapted to cooperate with the casing, 1, and the locking means associated therewith, is a member carried by the steering wheel of the vehicle, and this member may either take the form shown in Fig. 6, or that shown in Fig. 7. In the former case this member consists of a sleeve formed of two equal sections, 15, 16, adapted to be connected together by means of one-way screws 17, each of the portions 15 and 16 having slots 15ᵃ—16ᵃ, formed at their upper extremity, said slots being of a width sufficient to enable them to closely engage the spider arms of the steering wheel. The slots 15ᵃ—16ᵃ are formed opposite each other, and additional slots 15ᵇ, 16ᵇ, each comprising one-half the width of the slots 15ᵃ, 16ᵃ, are formed on the abutting faces of the sections 15 and 16.

In assembling this member upon the steering wheel, the sections 15 and 16 are separated, and are each placed with one of opposite spider arms entering their slots 15ᵃ, 16ᵃ respectively, and are brought together at the steering wheel cap with their slots 15ᵇ 16ᵇ cooperating to engage the remaining spider arms. When in this position, surrounding the cap of the steering wheel, with each spider arm disposed within a slot, the two sections 15 and 16 are connected together by the one-way screws 17, and when so connected cannot be disengaged without the use of special tools adapted particularly for this purpose.

The lower extremities of the sections 15 and 16 have a segmental portion cut-away, as indicated by the numeral 18, of Figs. 2 and 4. This cut-away segment is the locking portion adapted to cooperate with the locking pin 12, and when the pin 12, is in the locked position it will be projecting into the segmental portion 18, and when the wheel is rotated while the lock is in this position, the pin 12, will abut against either of the shoulders 19—19, and prevent further rotation of the wheel. It will thus be seen that when the pin 12 is in its locked or uppermost position, the steering wheel can be turned but one-third of its circumference, and therefore the wheels of the vehicle cannot be straightened sufficiently to enable the vehicle to be driven or towed in a forward direction.

That lower extremity of the sections 15 and 16 which is not cut away is formed with an annular groove 20, and adapted to cooperate with this groove is a rib 21, formed at the uppermost portion of the member 1ᵇ of the casing. This rib 21 is of a length equal to approximately one-third of the circumference of the casing. It will be noted that this rib is formed in the section 1ᵇ of the casing, and is directly opposite that portion of the casing containing the locking pin 12. This rib 21 in cooperation with the groove 20 effectually prevents the separation of the member mounted on the steering wheel and the casing 1, for when the locking pin 12 is projecting into the segmental cut away portion 18, the rib 21, will be in position, within the groove 20, and cannot be moved out of position within the groove, so long as the locking pin is in its locked position, for the steering wheel cannot be rotated sufficiently to bring the rib 21 out of the slot 20, due to the action of the locking pin 12, in abutting the shoulders 19—19. It will thus be seen that when the locking pin is in its locked position, it is impossible to remove the steering wheel from the steering post. When the locking pin has been withdrawn from its locking position, and the steering wheel can be rotated completely, the wheel can be brought to such a position that the rib 21 will leave the slot 20, and thereafter if it is desired to make any repairs to the steering wheel, the same can be removed from the steering post for this purpose.

A screw-threaded opening 22 is cut into the section 1ᵇ of the casing, and when the casing is in proper position, surrounding the casing of the steering post, a sharp tool is inserted through this opening, and a hole is punched in the casing of the steering post at this point. When this has been done, a one-way pointed screw 23 is inserted into the opening 22, with its pointed end projecting into the hole formed in the casing of the steering post. This is for the purpose of preventing the rotation of the lock casing on the steering post casing to release the locking rib 21 from its engagement with the groove 20. This screw being of the one-way type, it is impossible to withdraw it without the use of special tools, and therefore an unauthorized person cannot avoid the lock by rotating the casing.

In the modification shown in Fig. 7, the cap 25 of the steering wheel has its lower extremity cut away for one-third of its circumference, in a manner similar to that described in connection with the members 15 and 16, and the remainder of its lower extremity is grooved at 30 for the cooperation with the rib 21 of the locking casing. This latter form has been devised for the use of manufacturers of motor vehicles who place my improved lock on the vehicles before they leave the factory, and by forming the steering cap itself with this cutaway segmental portion, and the groove 30, the necessity for use of the members 15 and 16, is done away with. The latter is much the preferred construction, but cannot be used, unless the steering wheel is so made at the factory, and is therefore not adapted for use on machines heretofore manufactured.

In the operation of my device, assuming that the parts have been connected in proper position upon the steering post, with the members 15 and 16 in engagement with the spiders of the steering wheel, and assuming that the lock is in the unlocked position, the knob 6, carrying the post, 9, will be in an outwardly projected position, as shown in dotted lines, Fig. 4. By reason of the pin 14, abutting against the interior of the lock casing, backed by the spring 13, the locking pin 12, will be in its lowermost position, as indicated by dotted lines, Fig. 2. When the locking pin is in this position the steering wheel and therefore the members 15 and 16 can be freely rotated, and the vehicle can be driven in the usual manner. When the owner leaves his car, and wishes to lock the same against the theft by unauthorized persons, he will turn the steering wheel at an angle from the forward direction of the vehicle, and when in this position, the cut away segment 18 of the members 15 and 16, will be in position above the locking pin 12, the wheels of the vehicle having been turned to as near a right angle as is possible, so as to allow for the space occupied by the cut-away portion. With the wheels in this position, the owner of the vehicle will place his thumb or finger against the lower extremity of the locking pin 12, which as can be seen from an inspection of Fig. 2, will be projecting a slight distance below the bottom of the lock casing 1, and will push this locking pin upward as far as it will go. When the locking pin is in its extreme uppermost position, the knob 6 is pushed inwardly to the position shown in full lines in Fig. 4, and the rod 9 will enter the opening 12ª in the locking pin, and will thus prevent withdrawal of the pin. The owner of the vehicle will now give a few turns to the knob 6, sufficient to cause the tumblers of the lock to become disarranged. The steering wheel and therefore the wheels of the vehicle are now effectually locked, and there is no way in which a thief can successfully tamper with this locking device, and render the same inoperative.

The steering wheel of the vehicle cannot be removed due to the engagement of the rib 21 and the slot 20, the lock casing cannot be turned on the steering post, due to the pointed screw 23, the locking pin being fully enclosed within the lock casing, and the sleeves 15 and 16 cannot be tampered with, the tumblers and locking rod 9, being fully enclosed within the lock casing, cannot be tampered with, the connected portions of the casing 1 cannot be disconnected, due to the use of the one-way screws 2, and the sleeve portions 15 and 16 cannot be disconnected by reason of the one-way screws used in their construction. It will thus be seen that I have provided a lock which is as nearly thief-proof as it is possible to construct. It will also be seen that this method of construction permits a very wide locking space which is extremely important, as it allows much greater freedom in locking. Where the locking space is small the operator of the vehicle has to turn his wheels to an exact angle before he can find the point where the locking pin will enter, while in my construction it is only necessary to turn the wheel to approximately a correct position before the locking pin can enter the locking space, 18.

By the provision of the rib 21, extending but one-third of the circumference of the casing, it is possible to remove the steering wheel for purposes of repair, when the locking device is unlocked. With the locking casing and the locking sleeves 15 and 16, constructed as shown, no part of the casing of the steering post will have to be cut or drilled, except the small hole punched therein for the reception of the screw 23. Perfect rigidity of my device is secured without the necessity of screwing sleeves 15 and 16 into the hub of the steering wheel.

When the owner desires to release the locking engagement, he will work the combination lock in the required manner until the tumblers are in proper position and then the knob 6, and the locking rod 9 can be withdrawn, thereby permitting the withdrawal of the locking pin 12. As soon as the rod 9 has been withdrawn, the locking pin 12 will be projected downwardly due to the spring 13 and pin 14, which will project the pin until the shoulders thereof engage a part of the casing, and when in this position, the steering wheel can be fully rotated, and the vehicle driven in the usual manner.

My locking device can be attached to any of the vehicles now in use in a very short while. All holes are bored, drilled and tapped at the factory so that all that is necessary is the mere attachment of the lock in proper position, surrounding the case of the steering post. When the parts of the locking device are properly arranged to cooperate with each other, no further adjustments or changes are necessary, and the locking device is permanently in place. The possibility of removing the sleeve 15, 16, from the cap of the steering wheel is reduced to a minimum, because the sleeve embraces the prongs of the steering wheel, because the two parts are firmly screwed together by locking screws and finally because the casing of the lock embraces the lower ends of the two halves 15 and 16 of the sleeve, and therefore all three of these means would have to be defeated in order to remove the sleeve, and avoid its purpose.

It will be understood that the modification shown in Fig. 7 is adapted to operate in identically the same way as the form described heretofore, and it is impossible to remove the steering wheel in this case, due to the locking engagement of the rib 21 and the groove 30.

While I have shown a certain form of combination lock for the purpose of engaging the locking pin, it is to be understood that I do not limit myself to this particular form of lock, and any other satisfactory form could well be used in lieu thereof, and would serve the purpose in the same manner as in the present construction.

Having thus described my invention what I claim as new and desire to secure by Letters Patent is:—

1. The combination in a locking device for the steering wheel of a vehicle, of a member carried by the steering wheel and adapted to normally rotate therewith; a second member mounted adjacent the wheel; a rib formed on a portion of one member; a groove formed on a portion of the other member, adapted to receive said rib to prevent axial separation of said members when the rib is within the groove; a locking bolt within the second member; the first member having a recess therein adapted to receive the projecting end of said bolt, said recess being of greater length than the diameter of said bolt, so that when the bolt is projected into said recess the first member may have a limited rotation with respect to said second member; and means for retaining said bolt in the projected position.

2. The combination in a locking device for the steering wheel of a vehicle, of a member carried by the steering wheel and adapted to normally rotate therewith; a second member fixedly mounted adjacent the wheel; a rib on one member; a groove on the other member adapted to receive the said rib; the first member having a circumferential recess therein; a locking bolt in said second member adapted to be projected into said recess, said recess being of greater length than the diameter of said bolt so that when the bolt is projected into the recess the first member may have a limited rotation with respect to the second member, said locking bolt being adapted to enter the recess only when the said rib is in engagement with the said groove; and locking means for retaining the bolt in the projected position.

3. The combination in a locking device for the steering wheel of a vehicle, of a member carried by the steering wheel and adapted to normally rotate therewith; a second member fixedly mounted adjacent the wheel; a segmental circumferential groove in the first member; a segmental circumferential rib on the second member adapted to enter said groove when the members bear a certain relation to each other; a locking bolt within said second member; the first member having a recess in one extremity adapted to receive the projecting end of said bolt, said recess being of greater length than the diameter of the bolt, so that when the bolt is projected into the recess the first member may have a limited rotation with respect to the second member, said locking bolt being adapted to enter the recess only when the said rib is in engagement with said groove; and means for retaining the locking bolt in the recess.

4. The combination in a locking device for the steering wheel of a vehicle, of a member carried by the steering wheel and adapted to normally rotate therewith; a second member fixedly mounted adjacent the wheel; the first member having a circumferential recess formed in a portion of one extremity thereof; a groove formed in the remaining circumference of said extremity; a locking bolt carried by the second member adapted to be projected into said recess; a rib at one extremity of said second member, said rib being adapted to enter the said groove; and means for retaining the bolt in the projected position, said means comprising a lock; and a pin for cooperation with said lock adapted to engage said bolt and retain said engagement until the lock is released.

5. The combination in a locking device for the steering wheel of a vehicle, of a member carried by the steering wheel, said member comprising a sleeve adapted to surround the hub of said steering wheel, said sleeve being formed in two equal sections connected together; a lock causing fixedly attached adjacent the wheel adapted to cooperate with said sleeve, said lock casing being formed in two parts united in position on said post, the lower extremity of said sleeve being recessed through a portion of the circumference; a segmental groove formed in the remainder of said extremity; a locking bolt in said casing adapted to be projected into said recess; a segmental rib at the upper extremity of said casing adapted to enter the groove in the sleeve, the said sleeve and casing being held against axial separation when the rib sleeve, the said sleeve and casing being of greater length than the diameter of said bolt, the said bolt being adapted to be projected into the recess only when the rib is in engagement with the groove; a locking device for retaining said bolt in the projected position; resilient means for retracting said bolt upon the release of said locking means; and means carried by the casing for preventing the rotation of the same upon the steering post.

In testimony whereof I hereunto affix my signature.

ARTHUR E. MILLER.